May 19, 1925.

A. B. NELSEN 1,537,999

BATTERY CHARGING TRANSFORMER

Filed June 27, 1924

Inventor

A. B. Nelsen

By Clarence A. O'Brien

Attorney

Patented May 19, 1925.

1,537,999

UNITED STATES PATENT OFFICE.

ALBERT B. NELSEN, OF BERESFORD, SOUTH DAKOTA.

BATTERY-CHARGING TRANSFORMER.

Application filed June 27, 1924. Serial No. 722,726.

*To all whom it may concern:*

Be it known that I, ALBERT B. NELSEN, a citizen of the United States, residing at Beresford, in the county of Union and State of South Dakota, have invented certain new and useful Improvements in Battery-Charging Transformers, of which the following is a specification.

This invention relates to improvements in transformers and more particularly to a transformer construction and assemblage for use in connection with a battery for charging the same from an alternating current power circuit, ordinarily used for house lighting purposes.

An object of the invention resides in providing a transformer construction, wherein a pair of tubular members are mounted in spaced parallel relation adjacent one another by suitable holding or securing means which is carried by a base provided with suitable terminal connections and a rectifier, the tubular members being provided with windings, the winding on one tubular member forming a primary and that on the other tubular member forming the secondary.

Another object of the invention resides in providing a transformer of the above mentioned character, wherein a pair of tubular members are mounted in adjacent spaced relation on a base, by suitable mounting means which is carried by the base, one tubular member being provided with a primary winding having terminal connections with a terminal block carried by the base, and the other tubular member being provided with a secondary winding which is provided with a plurality of terminals arranged in circuit with a rectifier carried by the base, so that the current in the secondary will be used to illuminate the filament of a rectifier, while the secondary and rectifier are provided with connections to the terminal block in order that it may be interposed in a circuit with a battery to be charged.

The invention also includes other objects and improvements in the details of construction and arrangement of the parts, which are more particularly pointed out in the following description and claims, directed to a preferred form of the invention, it being understood, however, that various changes in the specific construction and arrangement of these parts, may be made, for varying conditions of operation of the transformer without departing from the spirit and scope of the invention as described and claimed.

In the drawing, forming a part of the application:

Figure 1:
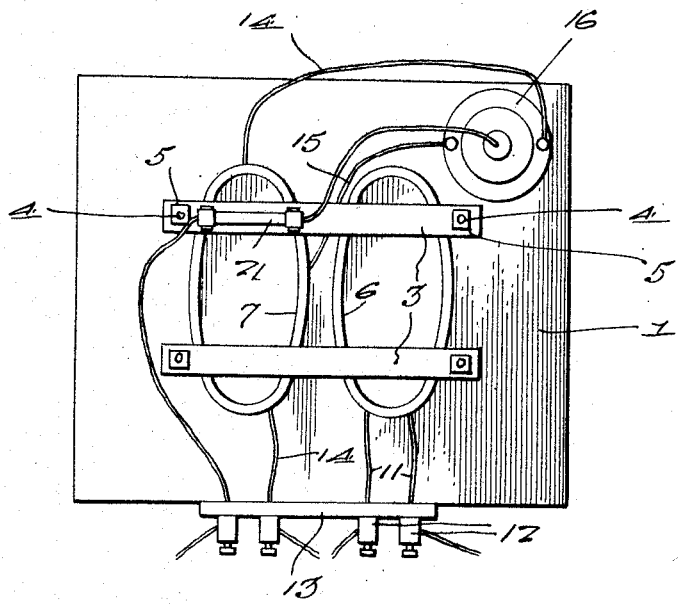
Figure 1 is a plan view of the improved type of battery charging transformer.
Figure 3:
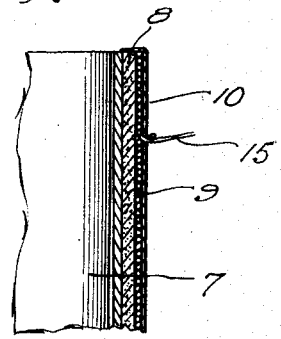
Figure 3 is a partial sectional view through a portion of one of the tubular members showing the manner of mounting the windings thereon.
Figure 2:
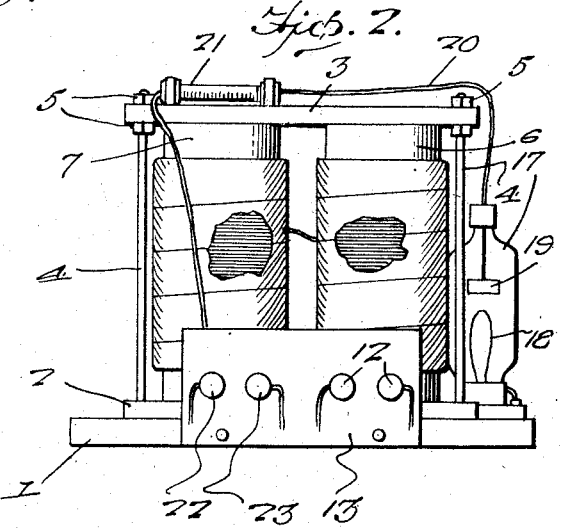
Figure 2 is a side elevation thereof.
Figure 4:
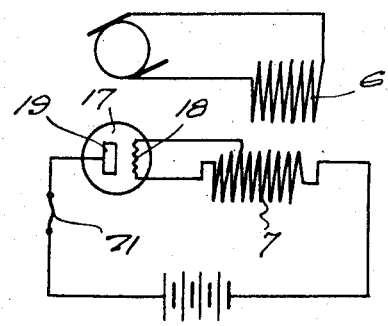
Figure 4 is a wiring diagram, showing the connection of the transformer with a source of power, a rectifier, and a battery, in order to illustrate the manner of wiring the same, for use in charging the battery.

A base is indicated at 1, on which is mounted a pair of bar members 2, having cooperating pairs of bar members 3, connected thereto, by a plurality of rod members 4, provided with threaded nuts 5, for adjusting the relation between the pairs of bars 2 and 3, in order to secure a pair of tubular members 6 and 7 respectively therebetween, in spaced parallel relation. The tubular members 6 and 7 are of oval cross section, as indicated in Figure 1, and are preferably constructed of stove pipe irons, which is provided with a suitable coating 8, of insulating material for receiving wire coils 9 to provide the primary and secondary windings for the transformer. The coils on each of the tubular members 6 and 7 are provided with a suitable protective covering 10. The primary winding is mounted on the tubular member 6 and has the ends provided with connections 11, with binding posts 12 on the terminal panels 13, mounted on one edge of the base. The tubular member 7 carries the secondary winding which is provided with wire connections 14 at opposite ends and a top connection with one of the coils intermediate the ends as indicated at 15. The top connection 15 is so arranged in connection with the coil winding that when the primary winding is energized with 110 volts, the circuit between one of the connections 14 and the top connection 15 of the secondary winding will have a potential of six volts, these connections being provided for connection with the sockets 16 of a vacuum tube rectifier 17, for providing the proper voltage and current for the filament 18 of said transformer. The plate connection 19 of the vacuum tube rectifier is provided with the wire connection 20 to a suitable form of fuse 21, mounted on one of the bars 3, while the other terminal of the fuse is connected to a binding post 22, on the terminal board 13, which has a binding post 23, for receiving the other connection 14 from the end of the secondary winding on the tube 7.

The binding posts 12 are connected with the usual 110 volt alternating current provided for house lighting purposes, while the binding posts 22 and 23 are connected in proper relation, with a battery which it is desired to charge. The windings of the secondary and primary are arranged so that the voltage produced across the terminals of the secondary will be equal to that of the battery, in order that it may be properly charged, the rectifier 17 rectifying the transformed alternating current to produce the necessary character of direct current for charging said battery, while the fuse 21 protects the battery.

From the foregoing description, it will be seen that a simple and efficient transformer construction has been provided which is particularly adapted for battery charging purposes, for use in connection with the usual alternating current supplied for house lighting purposes, at 110 volts. The stove pipe sections forming the tubular core for the primary and secondary windings which are mounted as are illustrated in the drawings, in adjacent spaced relation and parallel with respect to one another provides a structure wherein the transformer may be constructed at small cost, and which is particularly adapted for the transforming of 110 volt alternating current with the proper number of windings on the primary and secondary into the proper voltage for the charging of a storage battery. By placing the primary on one of said stove pipe members, and the secondary on the other of said members arranged in close proximity but spaced slightly from the primary windings, it will be seen that the stove pipe member carrying the secondary winding will be placed within the magnetic field of the primary, so that a substantial portion will pass through the tubular stove pipe core thereof and also the secondary windings and generate in the secondary the required or desired potential.

What is claimed is:

A transformer construction comprising a base, a pair of bar members secured on said base in spaced parallel relation, a pair of tubular stove pipe members mounted in vertical spaced relation on said bar members, a pair of cooperating bar members mounted in spaced relation on the upper ends of said tubular members, a plurality of rod members connecting the ends of the first mentioned pair of bar members with the corresponding ends of the second mentioned pair of bar members, a primary winding on one of the tubular members, a secondary winding on the other tubular member, a terminal panel mounted on the base, and connections between said primary and secondary windings and terminals on said panel.

In testimony whereof I affix my signature.

ALBERT B. NELSEN.